March 1, 1966  R. H. J. FIÉVET  3,237,367
MACHINE FOR PACKAGING MELTED CHEESE
INTO VARIOUS PRESENTATION PACKAGES
Filed Sept. 30, 1963  6 Sheets-Sheet 1
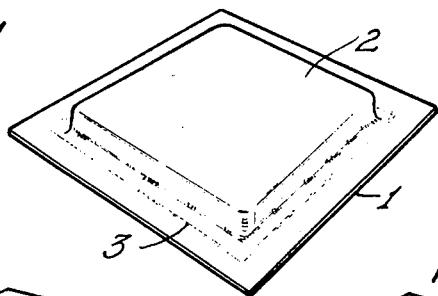
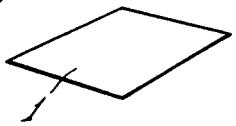
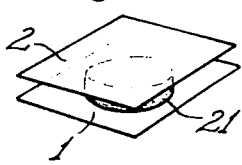
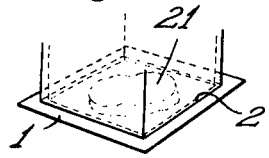
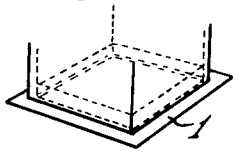
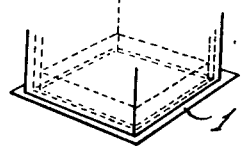
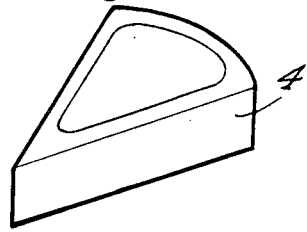
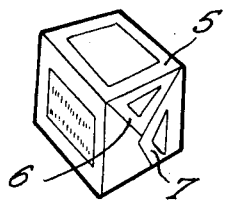

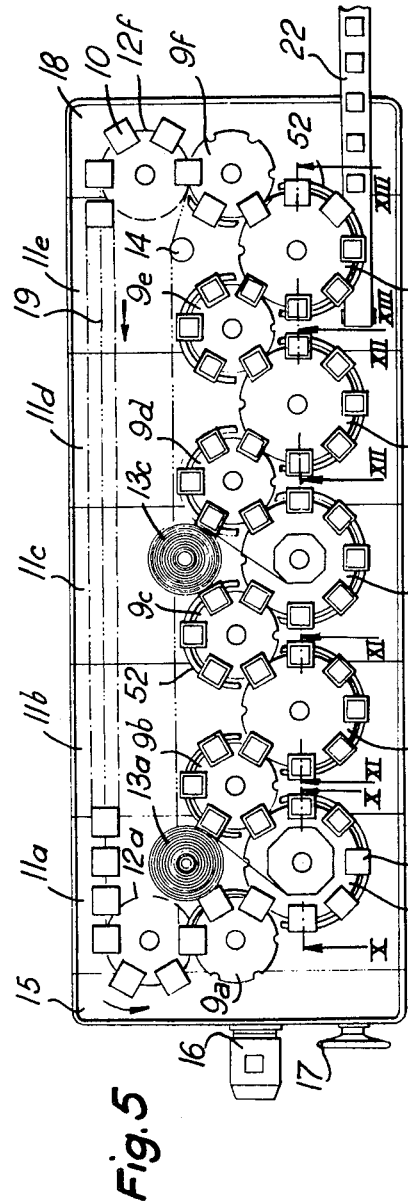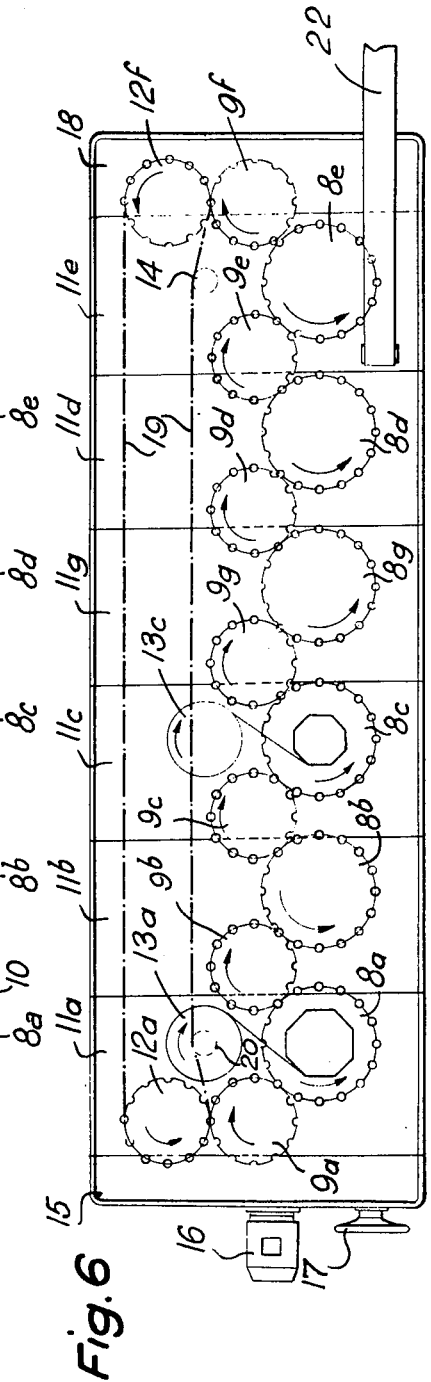

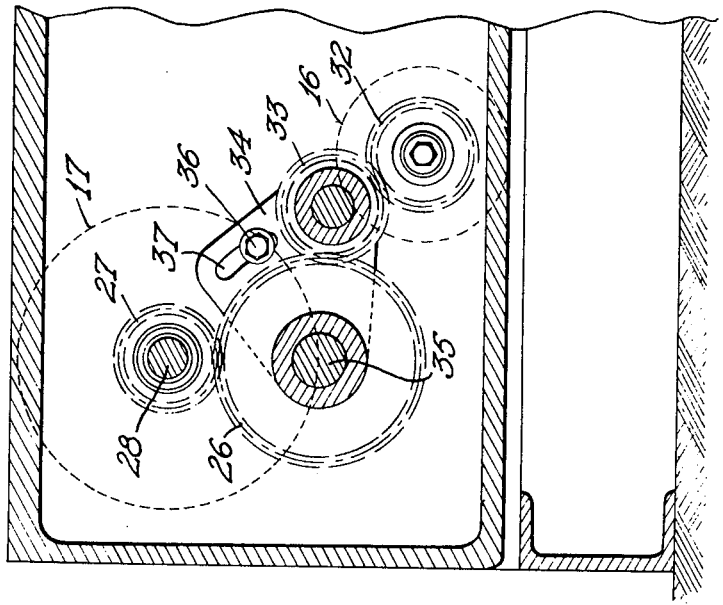
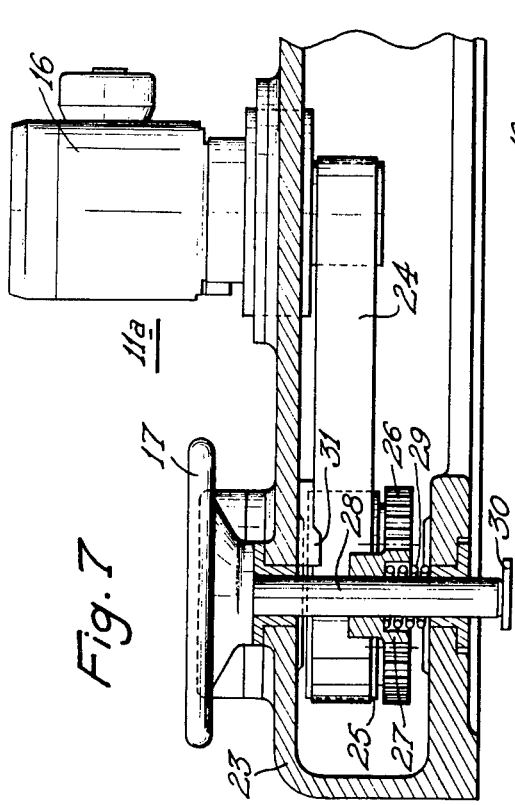
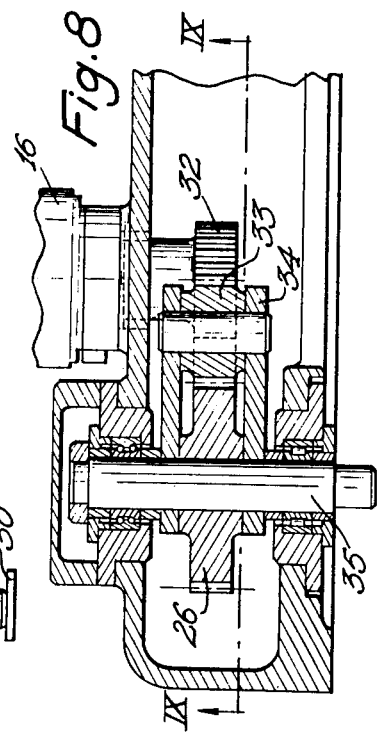

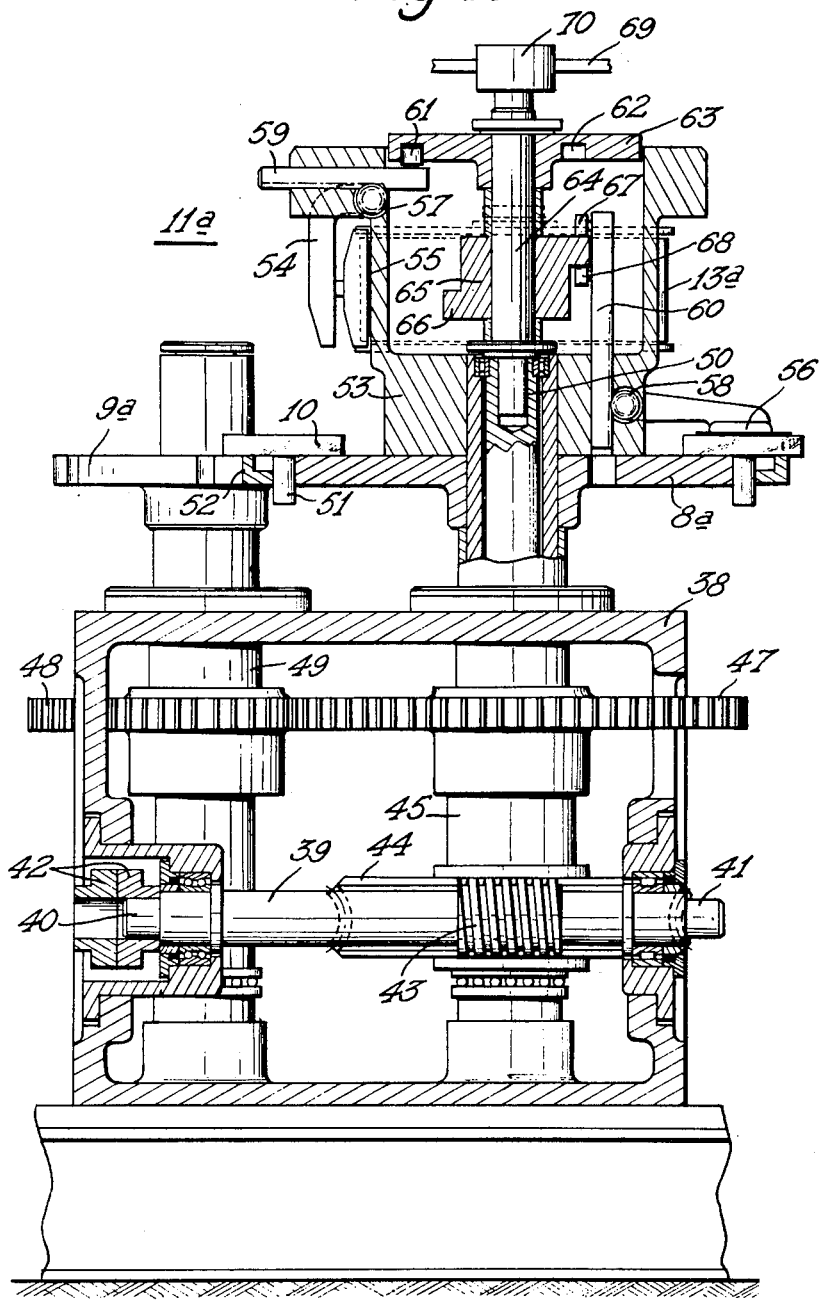

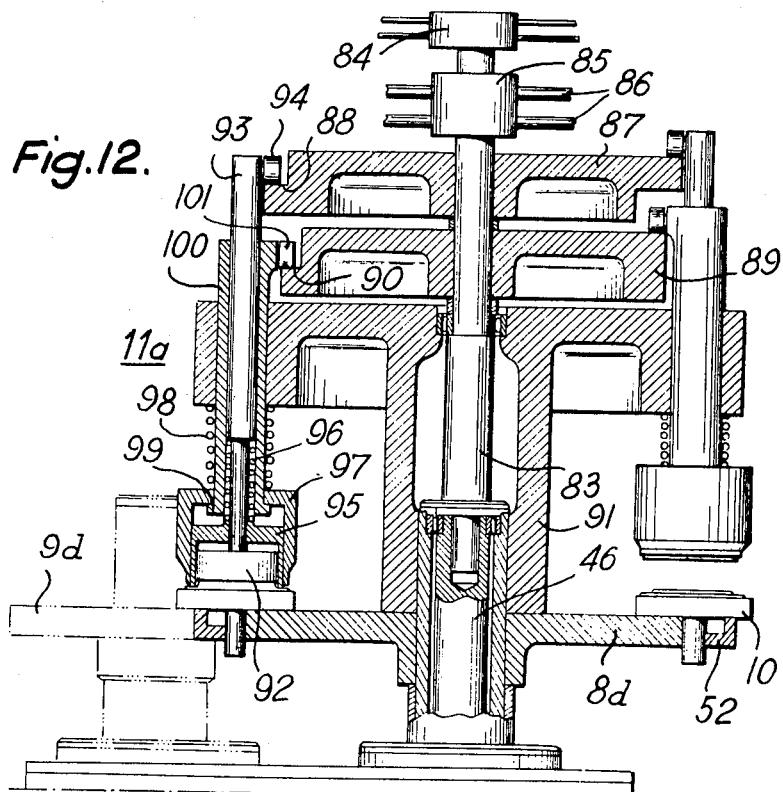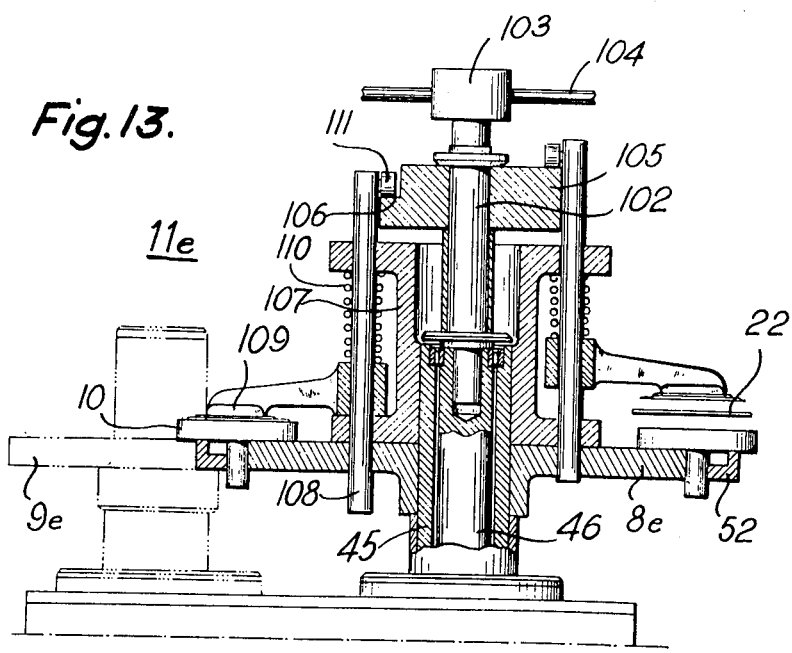

United States Patent Office 3,237,367
Patented Mar. 1, 1966

3,237,367
MACHINE FOR PACKAGING MELTED CHEESE INTO VARIOUS PRESENTATION PACKAGES
Robert Henri Jules Fiévet, Paris, France, assignor to Fromageries Bel-La Vache Qui Rit, Paris, France
Filed Sept. 30, 1963, Ser. No. 312,716
Claims priority, application France, Oct. 2, 1962, 910,996
12 Claims. (Cl. 53—122)

The present invention relates to the packaging of a viscous melted material such as melted cheese.

At present melted cheese is usually set to sale in three forms—slices, substantially triangular portions and cocktail cubes. The machines at present used for these various packages differ from one another and perform the various consecutive manufacturing operations stepwise—i.e., the various ingredients of the finished product—as a rule, a base, melted cheese and a cover—are moved stepwise and remain completely or substantially completely stationary during each operation. This leads to many disadvantages, such as abrupt movements which usually cause shocks, a waste of power at the end of each movement due to the kinetic energy of the manufacturing members and of the articles having to be retarded, loss of efficiency, because the articles are not given any actual processing during their various movements, and a noise which may sometimes be deafening.

It is an object of this invention to reduce these disadvantages and inter alia to obviate such shocks harmful to the various mechanisms, to reduce power wastage to improve efficiency and to reduce noise. This invention accordingly has as its main object to provide a machine for packaging melted cheese into various presentation packages, such as slices, portions and cocktail cubes comprising two parallel lines of rotating drums, one line being a working line and the other a transfer line, of the same diameter for each line, the drums having working and transfer stations disposed star-fashion and adapted to receive dies for packaging the cheese to the required package, an endless chain collecting the dies at the end product removal station to return the dies to the first packaging station, the drums being distributed over basic frames juxtaposed to form standard units each corresponding to one of the basic operations of packaging melted cheese to the required shape, each standard unit comprising a working drum and a transfer drum with their upstream and downstream controls and control inputs for juxtaposition of the unit with the adjacent units and, for each station of its working drum, the operative elements required for the basic packaging operation corresponding to such unit, the drum drives and the endless chain being driven by a single general driving motor, the delivery basic frame being devoid of working drum, the drum diameters, the dies move at a uniform tangential speed around said drums uniform relatively to their pitch circles.

Consequently, a single machine can be used to package melted cheese as slices, triangular portions or cocktail cubes just by changing the dies and, if necessary, the drums, the drums being replaced by drums of the same diameter but having a different number of stations to suit the different surface area of the various packages. The number of basic frames corresponds to the number of basic packaging operations which comprise at least the formation of a base, the pouring of the cheese, the formation of a cover, the pressing of the cheese on the base with simultaneous sealing of the cover and base, and the removal of the finished package. Basic frames can be added for the various extra basic operations, such as the positioning of an opener for the package and, in the case of triangular portions and cocktail cubes, for the or each folding of the base and/or cover, and for complementary operations, such as the grouping and cartoning of boxes of finished packages.

Each drum is rigidly secured to a driven rotating column mounted on a stationary central shaft adapted to receive, for the working drums, the stationary control elements for the operative devices rigidly secured to said working drums. Preferably, the control elements are cams centered on the drum axis and in engagement with rollers rigidly secured to the operative devices.

The following description, together with the accompanying non-limitative exemplary drawings, will show clearly how the invention can be carried into effect and will disclose other features. In the drawings:

FIG. 1 is a perspective view of the packaging of melted cheese into slice form;

FIGS. 2a to 2f are views, to a smaller scale and in perspective, of the basic operations required to package melted cheese into the slice shape illustrated in FIG. 1;

FIG. 3 is a perspective view of melted cheese packaged into a triangular portion;

FIG. 4 shows melted cheese packaged into a cocktail cube;

FIG. 5 is a plan view of a machine according to the invention for packaging melted cheese into slices;

FIG. 6 is a diagrammatic plan view of a machine according to the invention for packaging melted cheese into cocktail cubes;

FIG. 7 is a partial horizontal section of an initial element of a belt-driven machine;

FIG. 8 is a view similar to FIG. 7 but for a geared drive;

FIG. 9 is a section taken along the line IX—IX of FIG. 8;

FIG. 10 is a section to an enlarged scale, taken along the line X—X of FIG. 5, of the apparatus used for cutting and placing the blank which will form the base, in the case of a machine for packaging melted cheese into slices;

FIG. 12 is a partial sectional view, taken along the line XII—XII of FIG. 5, of an apparatus used for shaping the cheese and sealing the base and cover, for a machine for packaging melted cheese into slices, and FIG. 13 is a sectional view, taken along the line XIII—XIII of FIG. 5, of the apparatus used to remove the finished package, for a machine for packaging melted cheese into slices.

Figure 11:
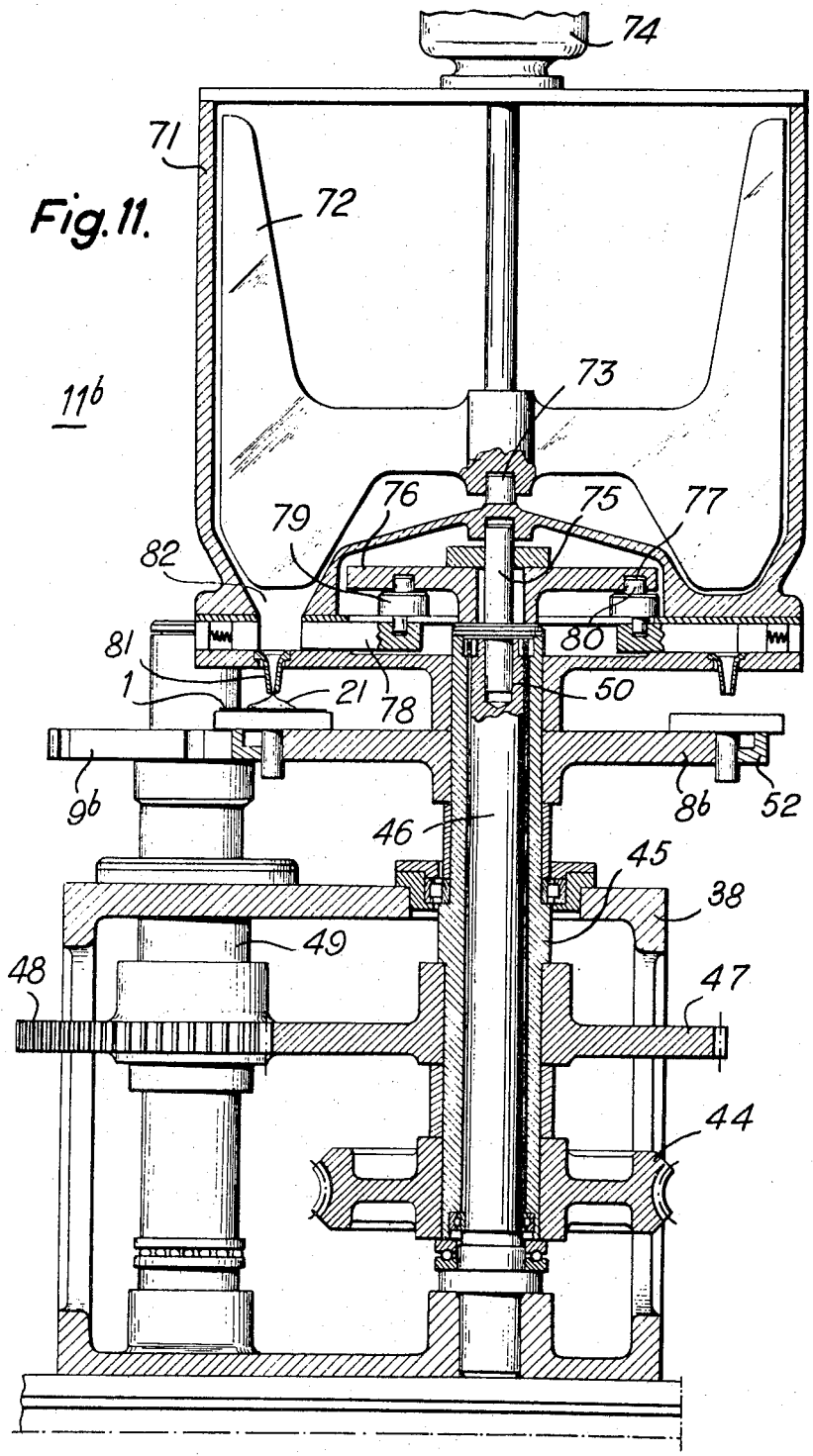
FIG. 11 is a sectional view to an enlarged scale, and taken along the line XI—XI of FIG. 5, of the apparatus used for pouring melted cheese in a machine for packaging the cheese into slices.

For setting to sale, melted cheese is usually delivered either as slices (FIG. 1) or as triangular portions (FIG. 3) or as cocktail cubes (FIG. 4). Each of these shapes comprises a base on which a mass of melted cheese is placed, and a cover to maintain such mass on such base.

Referring to the slice form, the base comprises a blank 1 cut from aluminum strip, and a false cover is formed by a cellophane blank 2 which is welded, as indicated by the reference 3, to the aluminum blank to cover the slice of melted cheese disposed between them. Similarly, the triangular portion form illustrated in FIG. 3 comprises an aluminum base 4 in which the melted cheese mass is placed and which is closed by a cover retained by folding the edges of the blank 4, the part being turned after manufacture to be presented as shown in FIG. 3. Referring to the cocktail cube, a preferably printed aluminum base 5 receives the melted cheese mass and is folded as denoted by the references 6, 7 in FIG. 4 after having received a cover retained by folds on the base, the cocktail cube being turned for presentation to the purchasers as shown in FIG. 4.

Clearly, therefore, to package melted cheese into any of the three forms specified, the five following basic operations are common to all three forms—formation of the base, pouring of the cheese, formation of the cover, pressing of the cheese on the base with a simultaneous sealing of the cover and the base, and removal of the finished package. In the case of the triangular portion and cocktail cube forms, one extra basic operation is required to make the various folds in the base. The blanks cut to form the bases are of substantially the same surface areas in the case of the slice and of the triangular portion, but the blank which will subsequently form a base for the cocktail cube form is substantially half the surface areas of the other blanks.

According to the invention, a single machine, such as that illustrated in FIG. 5 for packaging into slice form, is used to package melted cheese into various presentation forms, such as slices, triangular portions and cocktail cubes. The machine comprises two parallel rows or lines of rotating drums, namely working drums $8a$ to $8e$, and transfer drums $9a$ to $9e$. The drums of any one row have the same pitch diameter and comprise eight working stations disposed star-fashion in the case of the working drums 8, and six transfer stations disposed star-fashion in the case of the transfer drums 9. For each such station the corresponding drum is formed in its periphery with a semi-circular slot adapted to receive the tailpiece of a flat die 10 on which the packaging steps are effected. Each pair of working drums and transfer drums $8a$, $9a$ to $8e$, $9e$ are disposed on a basic frame $11a$ to $11e$. Each transfer drum 9 is in contacting engagement with the working drums 8 respectively disposed on the same basic frame and on the preceding basic frame, the distance between two successive working drums being less than the diameter of said transfer drum. These juxtaposed basic frames are identical and so their number can be increased or reduced depending upon the particular form of package required. The basic frames are formed with apertures adapted to receive accessory elements, such as a chain sprocket $12a$ contacting the transfer drum $9a$ and an aluminum strip reel $13a$ in the case of the basic frame $11a$, a cellophane reel $13b$ in the case of the basic frame $11c$, and a chain tensioner 14 in the case of the basic frame $11e$. Said reels are rotary driven by engagement of their strips with the operative elements of working drums $8a$ and $8c$.

The machine also comprises an initial element 15, on which a general driving motor 16 and a manual control member 17 are secured, and a terminal element 18 bearing a transfer drum $9f$ which is in alignment with the transfer drums $9a$ to $9e$ and which is of the same pitch diameter as the latter, while in contacting engagement with the working drum $8e$ and a chain sprocket $12f$ which is in engagement with an endless chain 19 running over the chain tensioner 14, and contacts the transfer drum $9f$ a chain-driving sprocket 20 borne by the shaft of the reel $13a$, and a sprocket wheel $12a$. The diameters of the working and transfer drums, the number of working and transfer stations thereof, and their drives are so devised that the dies 10 move at a highly uniform tangential speed.

On each basic frame $11a$ to $11e$ is effected one of the basic packaging operations which, in the case of producing packaged slices, comprises cutting and placing on a die 10 (FIG. 2a), the blank 1 which will subsequently form the base, placing melted cheese 21 on the blank 1 at a temperature of about 70° C. (FIG. 2b), cutting and placing the cellophane blank 2 on the melted cheese with a slight prestressing thereof (FIG. 2c), limiting the space to be taken up by the melted cheese (FIG. 2d), shaping the cheese in the space thus limited (FIG. 2e), and welding the cellophane blank to the aluminum blank (FIG. 2f). However, the shaping and welding operations can be so grouped that the basic frame $11a$ is used to supply, cut and position the base 1, the basic frame $11b$ is used for the pouring of the cheese onto the base 1, the basic frame $11c$ is used to supply, cut and place the cover 2 on the melted cheese, the basic frame $11d$ is used for size limitation, shaping and welding, and the basic frame $11e$ is used to remove the finished package on a conveyor belt 22.

To package the melted cheese into cocktail cubes, a machine of the kind illustrated in FIG. 6 is used; it is derived from the machine illustrated in FIG. 5 by the addition of a basic frame $11g$ between the basic frames $11d$ and $11e$ to perform the various foldings of the base edges, the overall mechanical control remaining the same. However, since the amounts of melted cheese used for cocktail cubes are less than the amounts used for slices and since the cut blanks which will subsequently form the base of the cocktail cube are substantially half the surface area of the blank 1, for the base of the slices to ensure satisfactory efficiency the number of stations are doubled on the working drums—so that the same have 16 stations—and on the transfer drums—so that the same have 12 stations.

The machine illustrated in FIG. 6 is used to package melted cheese into triangular portions of the kind illustrated in FIG. 3. In this machine, since the surface area of the blank which will subsequently form the base of the triangular portion is substantially twice that of the blank forming the base of the cocktail cube, the drums are replaced by drums having half the number of stations—i.e., by drums of the kind used in the machine illustrated in FIG. 5.

The initial element of the machine illustrated in FIG. 7 comprises a frame 23 on which the general driving motor 16 is mounted. The same drives via a belt 24 a pulley 25 which is mounted on the general driving shaft and which is coupled with a gear 26 engageable with a pinion 27 mounted on a shaft 28 controlled by a handwheel 17 for adjusting the machine with the motor 16 stopped. When the system is driven by the motor 16, the pinion 27 is kept disengaged from the gear 26 by a spring 29. A safety contactor 31 can be operated by the handwheel 17 being moved back in order to cut off the current for the motor 16, travel of the handwheel being limited by an abutment 30.

In the initial element embodiment illustrated in FIGS. 8 and 9, the motor 16 drives a gear 32 meshing with a pinion 33 mounted in a yoke 34 pivotable on the general drive shaft 35 and adapted to have its position adjusted in relation to the diameter of gear 32 by a pin 36 or the like which engages in a slot 37. The shaft 35 bears the pinion 26 driven by the pinion 33 and adapted to be engaged with the pinion 27 on the shaft 28 of the manual control device 17.

These embodiments provide all the flexibility desirable in changing the speed of drum rotation to suit the particular kind of packaging required, by a change either of the pulleys which drive the belt 24, in the case illustrated in FIG. 7, or by one or more of the pinions 32, 33, in the case illustrated in FIGS. 8 and 9.

As illustrated in FIGS. 10 and 11, each basic frame 11 comprises a framework 38 bearing a control shaft 39 terminating in two shoulders—a shoulder 40 inside the framework 38 and a shoulder 41 there outside—in order that the shaft 39 may be coupled by coupling devices 42 either with the general shaft of the initial element, in the case of the basic frame $11a$, or with the shafts of adjacent basic frames. The shaft 39 comprises a worm 43 which meshes with a worm wheel 44 mounted on a rotating column 45 centred on a stationary shaft 46 corresponding to the working drum of the basic frame. Such drum is secured to the rotating column 45, and the same bears a gear 47 which meshes with a gear 48 borne by a rotating column 49 adapted to receive the transfer drum. The stationary shaft 46 has at its top end a tapping 50 adapted to receive a stationary extension of said shaft. As can be seen in FIGS. 10 and 11, the gear trains 47, 48 are disposed at different levels for consecutive basic frames.

The terminal unit 18, which comprises the transfer sprocket 12f and chain drum 10f, is devoid of control shaft, the transfer drum shaft having a gear which meshes with the gear 47 of the basic frame 11e, the chain drum being an idler. The transfer sprocket 12f can be converted into a drum for cleaning the dies 10. If there are a number of other operations to be performed on the product after removal from the dies, the terminal unit 18 is replaced by a basic frame.

FIG. 10 illustrates the operative devices provided in the basic frame 11a used to supply, cut and place on the dies 10 the blank 1 which will subsequently form the base of the cheese portion. The working drum 8a in which the dies 10 are retained by their tailpieces 51 being received in the peripheral slots in such drum and maintained in circular arc by a stationary guide 52, bears a frame 53 supporting for each working station an assembly 54 comprising a gripper and knife and raisable to continuously receive an aluminum strip 55 unwinding from the reel 13a and to cut therein the blank 1 which is taken up by a sucker 56.

The assembly 54 and the sucker 56 are pivotally mounted and are associated with respective pinions 57, 58 in respective engagement with a horizontal toothed rack 59 and a vertical toothed rack 60. The toothed rack 59 bears a roller 61 which engages in a horizontal cam track 62 in a stationary member 63 borne by a stationary extension 64. Below the member 63 the extension 64 has a stationary part 65 having a cam track 66 engaged by two rollers 67, 68 borne by the toothed rack 60. The sucker 56 is connected to a negative pressure source through a duct 69 extending to a rotatable junction 70 mounted on the stationary extension 64. Through the agency of the cam tracks 62, 66, the assembly 54 grips the aluminum strip 55 and cuts a blank therein, and the blank is picked up by the sucker 56 and deposited thereby on the die 10.

The basic frame 11c is similar to the basic frame 11a just described, differing therefrom only in that the reel 13a is replaced by the reel 13c on which the cellophane strip is wound. In this case the sucker 56 of each working station of the basic frame 11c places a cut cellophane blank on the melted cheese placed, at the basic station 11b, on the aluminum blank forming the base, with a slight prestressing of the melted cheese.

The melted cheese is dispensed and poured in the basic frame 11b by means of the equipment illustrated in FIG. 11. Such equipment comprises a stationary vat 71 having a screw scraper 72 mounted on a bush 73 borne by the vat base and driven by a motor 74. The vat is mounted on a stationary extension 75 which also bears a stationary part 76 having a cam track 77. A piston type distributor 78 is provided below the vat 71. Each piston is associated with a sliding member 79 having a roller 80 which engages in the cam track 77. The distributor, which is rigidly secured to the rotating column 45, has opposite each piston 78 a nozzle 81 through which melted cheese for forming the mass 21 can flow onto the aluminum blank 1, the cheese being supplied to the pistons through an orifice 82 in the bottom of the vat.

After the mass 21 has been covered by the cellophane blank 2 forming the cover and has been slightly prestressed during its movement on the basic frame 11c, upon arrival at the basic frame 11d it is given size limitation treatment and shaping treatment and the base and the cover are sealed together.

The apparatus illustrated in FIG. 12 is used for this purpose and comprises a stationary extension 83 fitted to the stationary shaft 46 and bearing seriatim, from its top, an electric current distributor 84, a rotating junction 85 connected to a hydraulic fluid source through ducts 86, a stationary member 87 having a cam track 88, and a stationary member 89 having a cam track 90. Resting on the working drum 8 is a rotating frame 91 in which a triple-acting press is provided opposite each working station—i.e., each die 10. Each such press comprises an inner piston 92 whose piston rod 93 bears a roller 94 in engagement with the cam track 88. The piston 92 moves in a hollow intermediate frame 95 which is loaded by a spring 96 and which moves in a hollow outer frame 97 urged by a spring 98 into bearing engagement with the outside 99 of a hollow rod 100 bearing a roller 101 in engagement with the cam track 90. The hollow intermediate frame 95 is for limiting the volume to be taken up by the cheese when being shaped by the piston 92. The hollow outer frame 97, which is connected to the current distributor 84 and which has heating resistors, then seals the cellophane blank to the aluminum blank, the seal being cooled by fluid supplied via the rotating junction 85.

The slice thus packaged is conveyed by the transfer drum 9e to the working drum 8e of the basic frame 11e. The stationary shaft 46 of the drum 8e has a stationary extension 102 on which a rotating junction 103 connected through a duct 104 to a negative pressure source and a member 105 having a cam track 106 are mounted. Also mounted on the rotating column 45 is a frame 107 in which a member 108 rigidly secured to a sucker 109 slides at the level of each working station. Each sucker is loaded by a spring 110. The member 108 bears a roller 111 in engagement with the cam track 106. Each sucker 109 picks up the slice from the corresponding die 10 and places the slice on the discharge conveyor 22. When the cycle of operations has thus been completed, the dies are removed from the working drum 8e by the transfer drum 9f and loaded onto the endless chain 19 by the chain sprocket 12f for return to the transfer drum 9a. The dies 10 can be cleaned during their return trip. The working drums 8a–8e and the transfer drums 9a–9f are associated with peripheral circular arc guides, such as the guide 52 in FIG. 10, which guide the die tailpieces 51 to prevent them issuing from the peripheral slots in the drums.

The suckers 56 and 109, the nozzles 81 and the hollow rods 100 are respectively centered on the circular path of the dies on the corresponding working drums.

It is to be noted that the apparatus described with reference to FIGS. 10 to 13 as forming parts of a machine for forming slices are usable in a machine for forming packages having any other shape but comprising a mass of the viscous melted material to be packaged which is enclosed between sealed cover and base, such as triangular portions or cocktail cubes, which packages necessitate the performing of the five basic operations precedingly specified. For such different packages said apparatus are mounted on the same working drums of the same basic frames and differ only between each other by the dimensions and shapes of certain parts thereof.

The machine hereinbefore described provides a good accessibility to all the working drums, a regular flow of the dies without cusps due to the fact that said dies follow a path formed by successive loops and great facility for installation in a workshop. The machine, constructed with a circumferential pitch of 176 mm. and a tangential velocity of 705 mm./sec., provides three times the output of the prior art machines for triangular portions and slices—i.e., from 180 to 240 packages a minute—and six times the output of the prior art machines for cocktail cubes—i.e., from 360 to 480 cocktail cubes a minute.

Machines of the kind specified are highly flexible in use and are well adapted to follow market requirements since they can readily be converted to different kinds of processing. Also, standardisation of the basic frames greatly reduces the capital locked up in specialised machinery, spare parts storage and maintenance work.

What I claim is:

1. A machine for packaging viscous material into packages in which a mass of the material is enclosed between a sealed base and cover, said machine comprising an initial element, an aligned terminal element, and, disposed between said initial and terminal elements, a series of juxtaposed identical standard units the number of which is equal to that of the basic steps of the packaging operation to be performed for the corresponding package, which steps are respectively performed on said standard units and comprise at least five basic steps corresponding to the formation of the base from a strip of packaging material, the pouring of a mass of viscous melted material on said base, the formation of the cover from a strip of another packaging material with simultaneous placing of said cover on said mass, the pressing of said mass with simultaneous sealing of the base and cover, and the removal of the finished package, respectively; each standard unit comprising a frame, a rotating working drum with angularly equidistant peripheral stations carried by said frame, a rotating transfer drum with angularly equidistant peripheral transfer stations carried by said frame and in contacting engagement with said working drum and with the preceding working drum of the preceding standard unit, the distance between said working drum and said preceding working drum being less than the diameter of said transfer drum, whereby the working and transfer drums of all the standard units are respectively aligned along two parallel lines, driving means for driving said working and transfer drums, means for coupling said driving means with those of the adjacent standard units, operative devices respectively carried by said working drum for effecting at the working stations thereof the step of the packaging operation to be performed on said standard unit, and stationary control means fixed on said frame for controlling said operative devices, said machine being equipped with interchangeable series of working and transfer drums respectively having different numbers of working and transfer stations in relation with the surface areas of the various packages, respectively; a motor carried by said initial element, transmission means interconnecting said motor and the driving means of the first standard unit adjacent to said initial element, an output transfer drum carried by said terminal element which is identical to, and in alignment with, the transfer drums of said standard units while being in contacting engagement with the working drum of the last standard unit adjacent to said terminal element, transmission means interposed between the driving means of said last standard unit and said output transfer drum, two reels of strips of said packaging materials, two shafts supporting said reels and carried respectively by the standard units on which are performed the base and cover formation steps, each reel being rotary driven by engagement of its strip with the operative elements of the standard unit carrying the same, different sets of dies respectively corresponding to the various packages and on which all the steps of the packaging operations for obtaining said various presentation packages are respectively effected, means at the working and transfer stations of said working and transfer drums for supporting the dies of said different sets, whereby the path followed by said dies on said working and transfer drums is formed by successive loops, means for transferring the finished packages outside of the machine fom the standard unit on which the removal step from the dies is performed, and means for collecting the dies at said removal standard unit and returning said dies to the transfer drum of said first standard unit, the diameters of said working and transfer drums being respectively equal for said series, said diameters, the number of working and transfer stations on said drums as well as their driving means being arranged such that the dies of said different sets move at the same uniform tangential speed around said drums.

2. A machine according to claim 1, wherein the means for collecting the dies comprises two sprocket wheels respectively carried by the first standard unit and by the terminal element and respectively in contacting engagement with their transfer drums opposite the working drums in contacting engagement with said transfer drums, an endless chain meshing with said sprocket wheels, means on said endless chain for supporting the dies of the different sets, and a third sprocket wheel meshing with said chain and carried by one of the shafts supporting the reels, said shafts being disposed on the corresponding standard units between said chain and the working drums of said standard units.

3. A machine according to claim 1, wherein the stationary control means for controlling the operative devices of the working stations of each working drum is constituted by at least a control cam centered on the axis of said drum.

4. A machine according to claim 1, wherein the standard units are five in number and respectively correspond to the five basic steps of the packaging operation while on the one hand the working and transfer drums, and, on the other hand, the dies, respectively pertain to a series and to a set which are utilized to package the viscous melted material as slices, whereby said machine is usable for forming slices of melted cheese.

5. A machine according to claim 4, wherein a supplementary sixth standard unit is introduced between the standard units on which the steps of forming the cover and of pressing the mass of viscous melted material with simultaneous sealing of the base and cover are effected while the working and transfer drums of the six standard units pertain to a series utilized to package the viscous melted material as slices and the dies to a set utilized to package said material as triangular portions, said supplementary standard unit being provided to fold the sealed base edges, whereby said machine is usable for forming triangular portions of melted cheese.

6. A machine according to claim 5, wherein the working and transfer drums are replaced by the drums of same diameters pertaining to a series of drums having twice the number of working and transfer stations while the dies pertain to a set utilized to package the viscous melted material as cubes, the base and cover of which, have surface areas substantially equal to half that of the base and cover of a slice, whereby said machine is usable for forming cubes of melted cheese.

7. A machine according to claim 1, wherein the means for driving the working and transfer drums of each standard unit comprises two stationary central shafts fixed on the frame, a rotating transfer column mounted on one of said shafts and on which the transfer drum is rigidly secured, a rotating working column mounted on the other shaft and on which the working drum and the operative devices of said standard unit are rigidly secured, the stationary control means being rigidly secured on said other shaft, a worm wheel carried by said rotating working column, a horizontal shaft carried by said frame, a worm on said horizontal shaft in meshing engagement with said worm wheel, a pinion carried by the rotating transfer column, and a gear carried by said rotating working column, the pinion and the gear being disposed at different vertical levels for consecutive standard units, and wherein the transmission means interposed between the driving means of the last standard unit and the output transfer drum comprises a stationary central shaft carried by the terminal element, a rotating output column mounted on said last shaft and on which said output transfer drum is rigidly secured, and a pinion carried by said output column and meshing with the gear of said last standard unit.

8. A machine according to claim 7, wherein the means for interconnecting the motor and the driving means of the first standard unit comprises a gear transmission connected to said motor, a coupling device interconnecting said gear transmission and one end of the horizontal shaft of said first standard unit, and a manual control device having a pinion adapted to be engaged with a gear of said transmission when said motor is stopped.

9. A machine according to claim 7, wherein the operative devices at each working station of the working drum equipping the standard units on which the basic steps of forming the base and the cover are effected and their stationary control means comprise a gripper and knife assembly engaging the corresponding strip of packaging material, a pinion with a horizontal axis carried by said assembly, a radial horizontal rack engaging said pinion, a roller carried by the inner end of said rack, a sucker centered on the circular path of the dies on said working drum, means for connecting said sucker to a negative pressure source, a second pinion carried by said sucker, a vertical rack engaging said second pinion, a pair of rollers carried by said vertical rack proximate its upper end, a support fixed on the working drum for supporting said first and second pinions, a stationary extension fixed on the stationary central shaft of said working drum, and two cams carried by said central shaft, centered on the axis of said shaft and respectively engaging the roller of the horizontal rack and the pair of rollers of the vertical rack.

10. A machine according to claim 7, wherein the operative devices of the working drum equipping the standard unit on which the pouring of a mass of viscous melted material on the base is effected and their stationary control means comprise a stationary extension fixed on the stationary central shaft of the working drum, a horizontal cam mounted around said stationary extension, a stationary vat secured on the upper end of said extension and having an orifice in the bottom thereof, a scraper in said vat, a motor for driving said scraper, a piston type distributor carried below the vat by the rotating column on which said working drum is secured and formed through its upper wall with a central aperture and with an orifice which is at the same distance from the drum axis as the bottom vat orifice, and, for each working station of said working drum, a piston slidable in said distributor, a roller carried by said piston and engaging said horizontal cam after passing through said central aperture, and a nozzle fixed opposite said piston through the bottom wall of said distributor and centered on the circular path of the dies on said working drum.

11. A machine according to claim 7, wherein the operative devices of the working drum equipping the standard unit on which the pressing of the mass of viscous melted material with simultaneous sealing of the base and the cover is effected and their stationary control means comprise a stationary extension fixed on the stationary central shaft of the working drum, two superposed cams carried by said extension and centered on the axis of said central shaft, a rotating frame secured on the rotating column carrying said working drum, and, for each working station of said working drum, a vertical triple-acting press carried by said rotating frame and centered on the circular path of the dies on said working drum, said press comprising a hollow rod slidably mounted in said rotating frame, a roller carried by said rod and engaging the lower cam, a hollow outer frame loosely mounted on said hollow rod, heating resistors on said hollow outer frame for sealing the base and the cover, a spring interposed between said hollow outer frame and said rotating frame, means for connecting said hollow outer frame to an electric current source and to a cooling fluid source, an inner piston housed in said hollow outer frame for pressing the mass of viscous melted material and having a rod slidably mounted in said hollow rod, a second roller carried by said rod and engaging the upper cam, a hollow intermediate frame slidably movable and disposed between said hollow outer frame and said piston for limiting the volume to be taken up by the pressed mass of viscous melted material to that of the package to be formed, and a second spring interposed between said intermediate frame and the rod of said piston.

12. A machine according to claim 7, wherein the operative devices of the working drum equipping the standard unit on which the removal of the finished package is effected and their stationary control means comprise a stationary extension fixed on the stationary central shaft of the working drum, a cam carried by said extension and centered on the axis of said central shaft, a rotating frame secured on the rotating column carrying said working drum, and, for each working station of said working drum, a sucker centered on the circular path of the dies on said working drum and slidably and resiliently mounted on said rotating frame, means for connecting said sucker to a negative pressure source, and a roller connected to said sucker and engaging said cam.

References Cited by the Examiner

UNITED STATES PATENTS

| | | | |
|---|---|---|---|
| 2,246,016 | 6/1941 | Sinclair | 53—123 |
| 3,018,594 | 1/1962 | Phillips et al. | 53—72 |
| 3,129,546 | 4/1964 | Redmond | 53—123 X |

TRAVIS S. McGEHEE, *Primary Examiner.*

HUGH R. CHAMBLEE, *Examiner.*